UNITED STATES PATENT OFFICE.

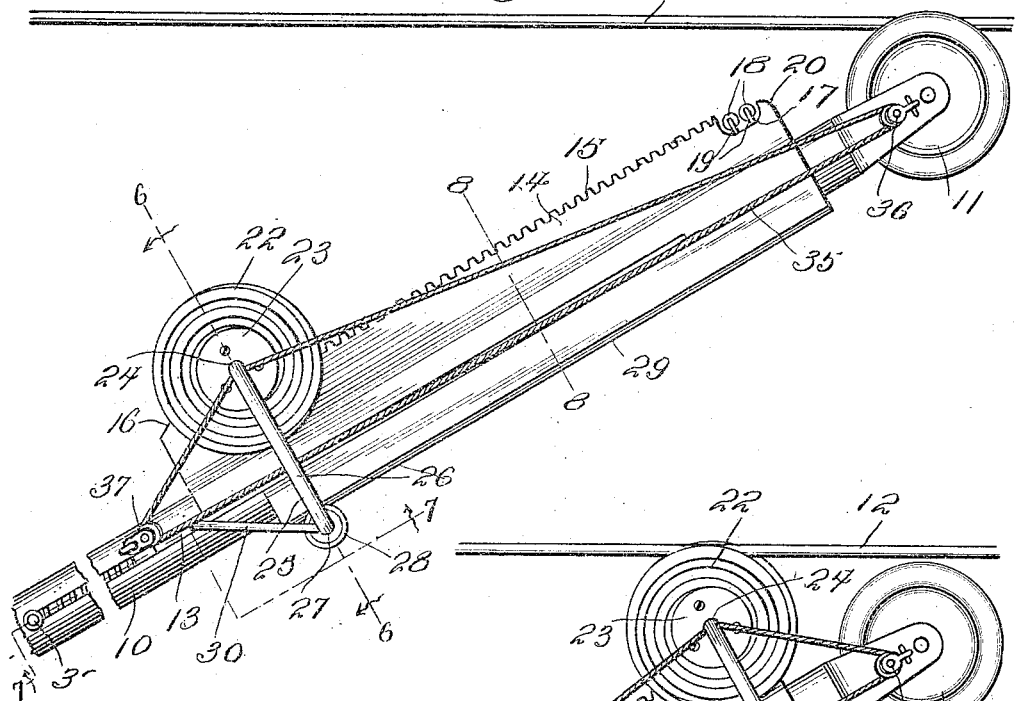
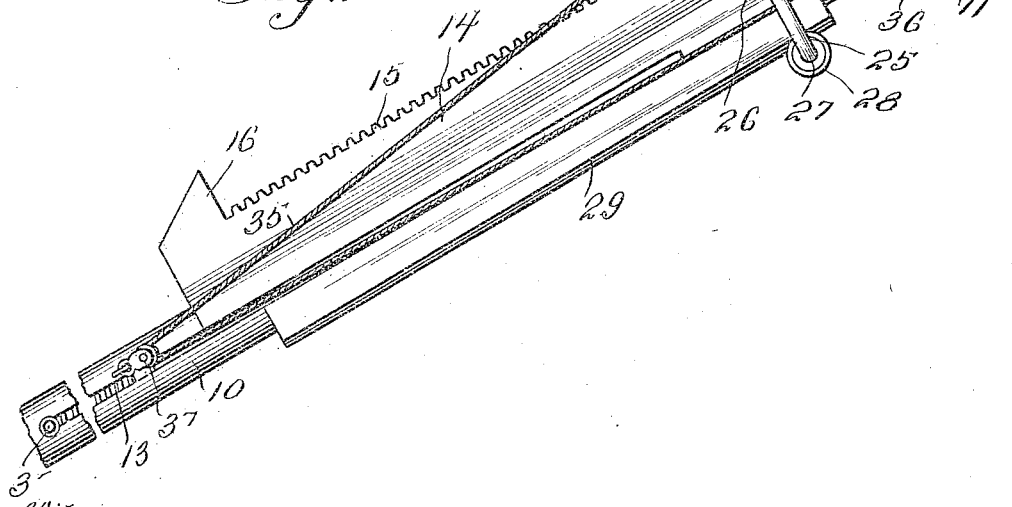

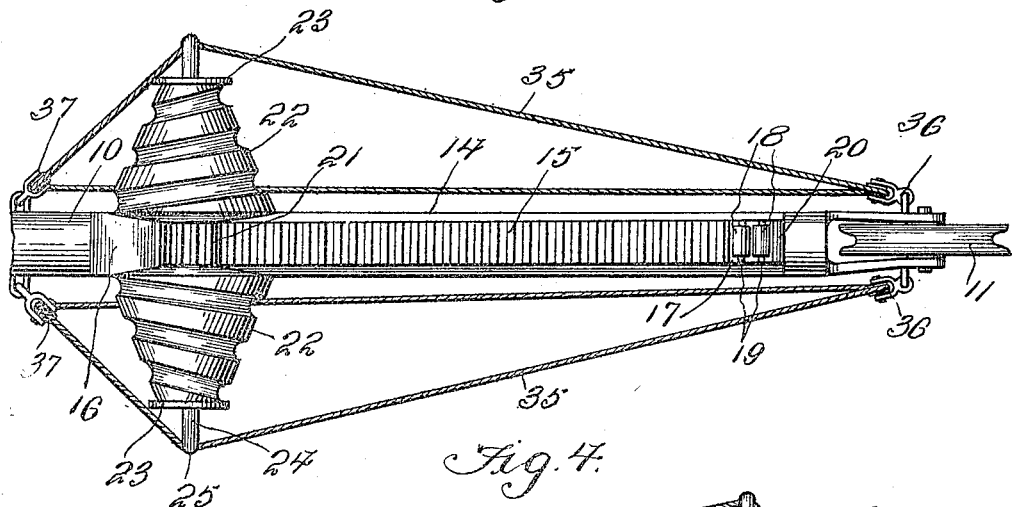
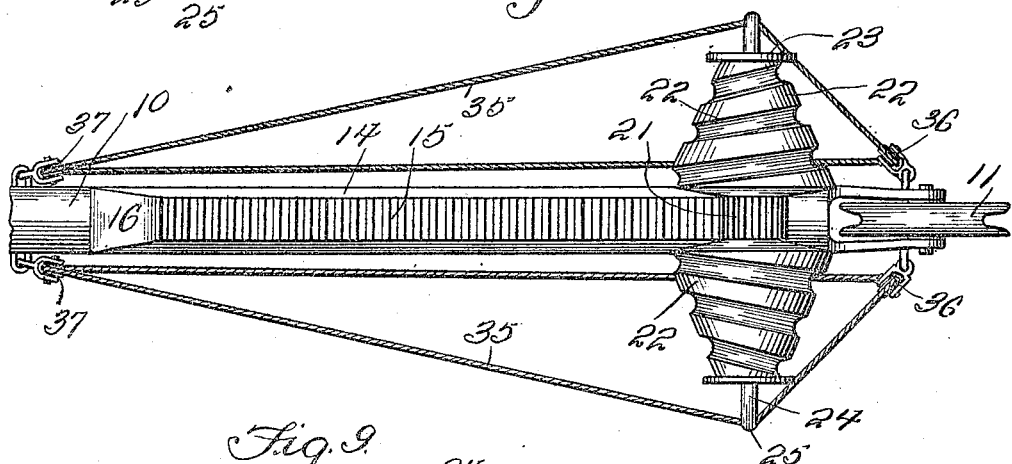
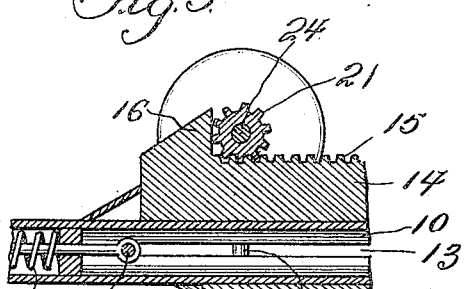

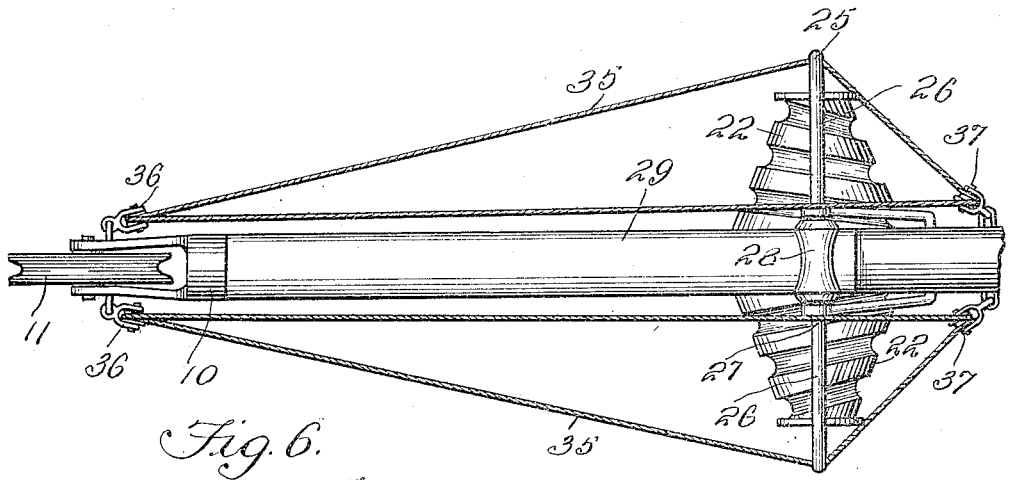
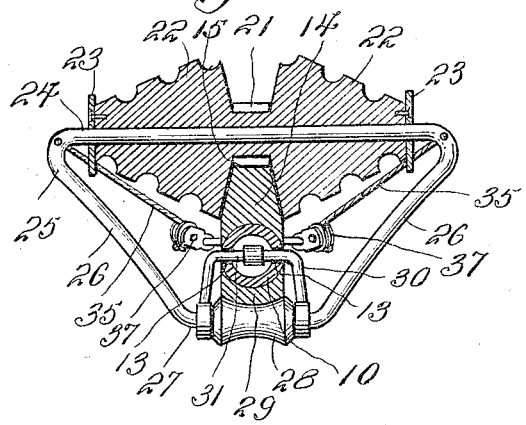
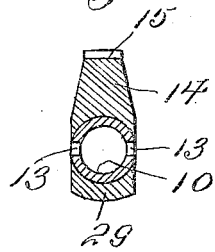
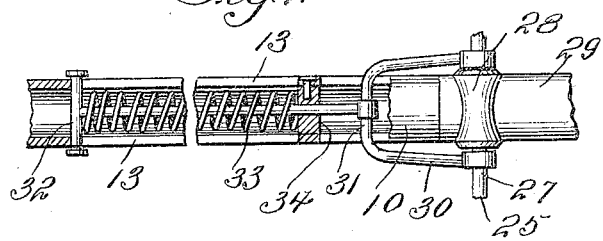

HARRY G. ALBIETZ, OF ST. LOUIS, MISSOURI.

TROLLEY-REPLACER.

1,295,095.  Specification of Letters Patent.  Patented Feb. 25, 1919.

Application filed June 21, 1918. Serial No. 241,208.

*To all whom it may concern:*

Be it known that I, HARRY G. ALBIETZ, a citizen of the United States, residing at St. Louis, in the State of Missouri, have invented new and useful Improvements in Trolley-Replacers, of which the following is a specification.

This invention relates to trolley replacers, and is designed to produce a device actuated by contact with a feed wire for replacing a trolley wheel on the feed wire after the latter has jumped the former.

The invention has for its primary object to produce traveling means arranged upon a trolley pole and adapted, when contacted by the upward spring of the pole, after the trolley wheel jumps the wire, to contact with the said wire and guide the same onto the trolley wheel, and thereafter to automatically leave the wire and travel downward of the pole to arrange itself in its initial non-feed wire contacting position.

It is a still further object of the invention to produce a trolley replacer which, with slight alterations, may be arranged upon any ordinary trolley pole or harp, which shall be of a simple construction, automatic in action, and thoroughly efficient for the purpose devised.

Other objects and advantages will appear as the nature of the invention is better understood, reference being had to the accompanying drawings, in which—

Figure 1 is a side elevation of the improvement.

Fig. 2 is a similar view, but showing the arrangement of parts when the trolley wheel is being replaced on the feed wire.

Fig. 3 is a top plan view of the device as illustrated in Fig. 1.

Fig. 4 is a similar view of the device as illustrated in Fig. 2.

Fig. 5 is a bottom plan view of the improvement, in the position illustrated in Fig. 1.

Fig. 6 is a transverse sectional view approximately on the line 6—6 of Fig. 1.

Fig. 7 is a detail longitudinal sectional view approximately on the line 7—7 of Fig. 1.

Fig. 8 is a detail transverse sectional view through the toothed bar, the trolley pole at the slotted portion thereof and the track.

Fig. 9 is a detail vertical longitudinal sectional view through the toothed bar, trolley pole and track showing the cog wheel connected with the cones limited in its movement in one direction by contact with the stop formed on the lower end of the toothed bar.

The trolley pole 10 is connected to the top of a car in the usual manner, and is spring influenced so as to swing the same upwardly to bring the outer harp end thereof, and the trolley wheel 11 journaled in said harp, in the direction of the feed wire 12. As the spring and pivotal connection between the trolley pole and the car is well known in the art, an illustration thereof has not been deemed necessary.

The trolley pole is preferably of the hollow tubular formation, and has its under face, for a suitable distance from the harp end thereof, provided with an elongated slot 13, the purpose of which will hereinafter be apparent.

On the upper side of the pole, inward of the harp is secured a longitudinally arranged plate or bar 14, the same having its upper surface provided with spaced teeth 15. The bar, inward of the teeth 15, is formed with an angular stop 16, and outward of the teeth 15, is provided with a transverse depression or opening 17. In the opening 17 are arranged two spaced rollers 18. These rollers have their shafts journaled in suitable bearing openings provided in brackets 19 secured to the opposite ends of the bar 14 and extending to within the opening 17. It is, of course, to be understood that the rollers may be journaled in any other desired manner, but the bar 14, outward of the rollers, projects a suitable distance above the outer roller, or the roller next to the trolley wheel, the said projecting portion being indicated by the numeral 20.

Engaging with the teeth of the bar 14, and normally contacting with the stop member 16 is a cog wheel 21. The wheel is formed with or secured on the inner and widened ends of cones 22. The respective cones 22 have their outer periphery provided with threads, the said threads being oppositely directed, that is the threads of one of the cones 22 are arranged at a right hand pitch and the threads of the other cone 22 are arranged at a left hand pitch so that when the feed wire is received in the grooves between the threads, the cones rotate in one direction, and the said feed wire will be directed centrally between the cones, or directly over the cog wheel 21 which is of materially less diameter than the inner and widened ends of the cones. The cones upon their outer and narrower ends are provided with guide flanges 23. The cones 22 as well as the cog wheel 21 have central alining openings which receive the upper and longer arm 24 of a substantially bail-shaped member 25. The side arms of the bail 25 are indicated by the numeral 26 and extend inwardly toward opposite sides of the trolley pole, being directed a suitable distance therebelow and the lower and shorter arm 27 of the said bail is arranged below the trolley pole. This arm provides a shaft for a spool roller 28, the said roller being guided on a track or rail 29 that is secured to the under face of the trolley pole 10. The track or rail 29 has its under face convexed to receive the concaved periphery of the spool of the roller 28, and from the above it will be noted that the upper and lower parallel arms of the bail 25 provide shafts for the cone striking elements, the cog wheel secured thereto and the roller 28.

Secured to the shaft 27 for the roller 28, outward of the said roller are the parallel arms of a substantially U-shaped frame 30. This frame is centrally provided with an arm 31 that is arranged in the slot 13 of the trolley pole and may be provided with a straight extension having the inner end thereof formed with a head 32. Upon the extension of the arm 31 is a helical spring 33 which exerts a tension between the head 32 and a suitable stop bracket 34 arranged in the trolley pole. The spring 33 influences the bail 25 in a downward direction with respect to the trolley pole, bringing the cog wheel 21 normally in contact with the stop 16 on the bar 14.

Secured to the upper shaft or arm 24 of the bail 25, to the opposite sides of the trolley pole is a cable 35. Each of these cables is trained around a pulley 36 which is journaled on the opposite sides of the trolley harp as well as being trained around a similar pulley 37, journaled in a suitable bearing on each of the sides of the trolley pole a suitable distance inward of the rack bar 14.

By reference to the drawings, it will be seen that the respective cables 35 are positioned at a considerable outward angle from their connection with the shaft or arm 24 and the outer pulleys 36. Should the trolley wheel jump the feed wire the spring influenced trolley pole will swing the same upwardly, causing one of the cables 35 to contact with the feed wire. This contacting engagement between the cable and the feed wire will have a tendency to first pull the directing cones and the guide roller 28 outward of the pole, or in the direction of the trolley wheel. The cables then serve as guides for directing the feed wire onto the outer and reduced end of one of the directing cones 22. The pressure between the grooves in the cone and the feed wire, incident to the influence of the spring which normally swings the trolley pole in an upward direction, will cause the directing cone to revolve and to travel upward of the trolley pole, the cog wheel interengaging with the teeth 15 of the bar 14. When the cog wheel passes off of the teeth or rack 15 and onto the rollers 19, the cones and cog wheel will still revolve, but, of course, cannot travel farther in an upward direction on the pole. The turning of the cones will cause the feed wire to travel from the reduced to the enlarged ends of the said cones, and as a consequence turn the trolley pole upon its pivotal connection with the car to bring the trolley wheel directly under the feed wire. When the feed wire leaves the screw or depression of the cone it falls directly between the respective cones over the cog wheel and is properly positioned to engage in the groove of the trolley wheel. The directing means is now relieved of the pressure of the feed wire, and the spring 33 exerts its force to cause the same to travel downwardly of the pole to its initial or inoperative position.

It is believed, from the foregoing description, when taken in connection with the drawings, that the simplicity of the construction, the arrangement of parts and the device will be clearly understood without further detailed description.

Having thus described my invention, I claim:—

1. The combination with a spring influenced trolley pole having a trolley engaging a feed wire, a rack bar on said pole adjacent to the outer end thereof, a cog wheel engaging said rack bar, spiral cones projecting laterally from said cog wheel, guide means for the cog wheel and cones, spring means for retaining said cones and cog wheel in one position on the pole, means between the cones and trolley harp adapted to engage with the feed wire, when the trolley is displaced and to guide said trolley onto one of said cones, whereby to rotate the latter to cause the cog wheel to travel upon the rack bar and to bring the feed wire between the cones beneath the trolley, and means for thereafter returning the cones to their initial position.

2. The combination with a spring influenced trolley pole having a trolley engaging a feed wire, a rack bar on said pole, a stop on the inner end of said rack bar, roller members on the opposite end of said rack bar disposed below the said end of the said bar, a cog wheel engaging the rack bar, oppositely threaded laterally disposed cones on said cog wheel, a shaft therefor, guide means between the shaft and the pole, spring means connected with said shaft for retaining the cog wheel in contact with the stop, laterally extending flexible elements between the shaft and the harp of the trolley pole designed, when the trolley is displaced, to contact with the feed wire onto one of the cones and by virtue of such contact to revolve the cone and cause the cog wheel to travel on the rack bar over the rollers and to bring the feed wire off of the cone centrally of the cog wheel and above the trolley and said spring means adapted, when the trolley leaves the cone to return the cones and cog wheel to their initial position.

3. The combination with a spring influenced trolley pole having a trolley engaging a feed wire, of a rack bar on said pole inward of the trolley, a stop on one end of the rack bar, rollers on the outer end of said rack bar, a cog wheel engaging the rack bar, spirally grooved cones on the opposite sides of the rack bar, guide flanges on the outer and reduced ends of said cones, a bail straddling the trolley pole and providing a shaft for the cones and cog wheel, a track upon one face of the pole, a grooved roller journaled on said bail and engaging said track, a frame connected with the bail, a spring influenced arm on the frame for normally returning the bail in one position and the cog wheel in engagement with the stop, pulleys on the opposite sides of the trolley harp, pulleys on the opposite sides of the trolley inward of the bail, flexible elements secured to the upper arms of the bail and trained around said pulleys, all as and for the purpose specified.

In testimony whereof I affix my signature.

HARRY G. ALBIETZ.

Copies of this patent may be obtained for five cents each, by addressing the "Commissioner of Patents, Washington, D. C."